Sept. 4, 1956 M. W. DAWLEY 2,761,530
BRAKE COOLING DEVICE
Filed Nov. 17, 1950 2 Sheets-Sheet 2
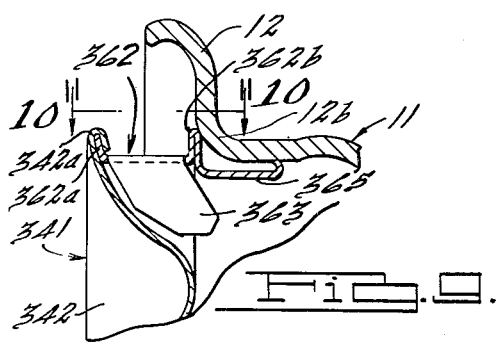
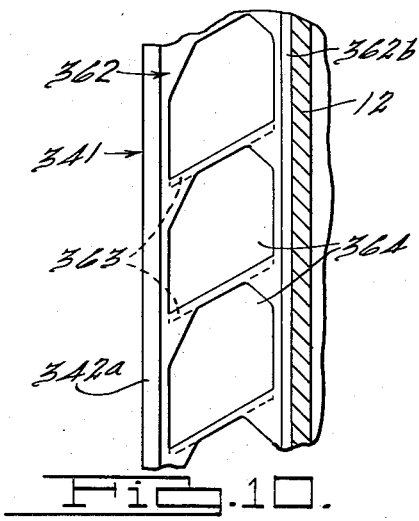
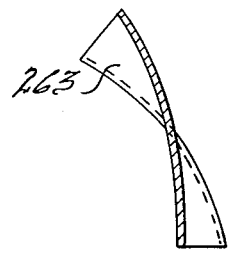
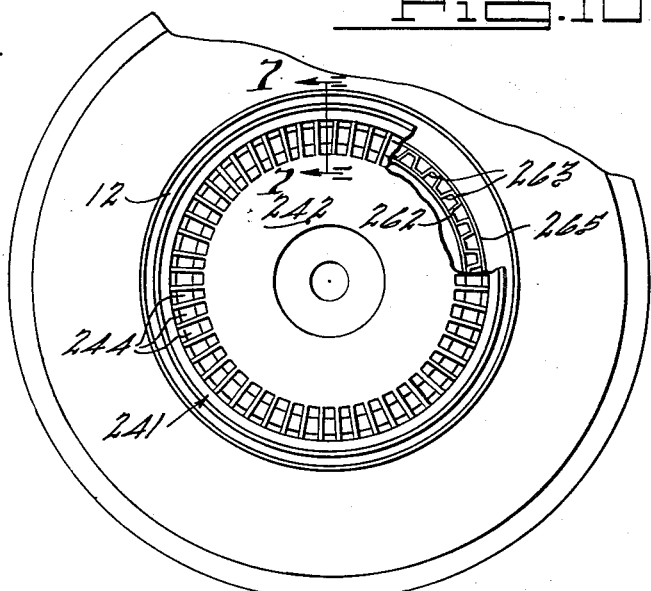
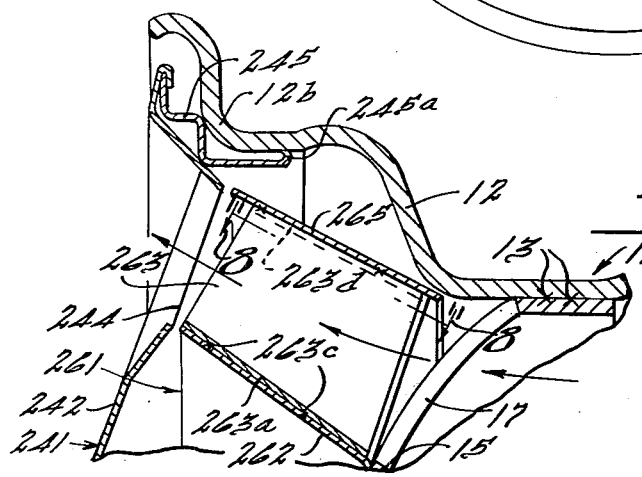
INVENTOR.
Morgan W. Dawley
BY
Harness and Harris
ATTORNEYS.

United States Patent Office 2,761,530
Patented Sept. 4, 1956

2,761,530

BRAKE COOLING DEVICE

Morgan W. Dawley, Rochester, Mich., assignor to Chrysler Corporation, Highland Park, Mich., a corporation of Delaware Application November 17, 1950, Serial No. 196,325

7 Claims. (Cl. 188—264)

This invention relates to a device for cooling the brake drum of a motor vehicle wheel brake or the like. More particularly this invention involves the incorporation of a fan driven air circulating and heat dissipating system in a conventional wheel assembly in a manner whereby brake generated heat is effectively dissipated such that vastly improved braking action is achieved. This invention, in several of its disclosed forms, comprises a plate-like fan element and a plate-like wheel cover element each of which elements are separately and detachably connectible to a conventional wheel disc. In another form of the invention the wheel cover and the fan element are combined to form a unitary structure that is simple in design and most economical to manufacture.

It is a primary object of this invention to provide a wheel cover and an enclosed wheel mounted fan element that may be detachably connected to the conventional wheel disc in such a manner that the appearance of the wheel assembly is improved and the cooling effect on the associated wheel brake increased such that vastly improved braking results.

It is another object of this invention to associate a wheel cover element and a wheel mounted fan element in such a manner that each element may be nested within the periphery of the exposed face of the conventional wheel disc. In several forms of the invention the wheel cover element and the fan element are arranged in such a manner that each element is independently supported on the wheel disc thus there is little likelihood of either element becoming detached from the wheel disc as a result of impact or centrifugal action, or the like.

It is another object of this invention to provide a wheel cover with air discharge louvres arranged in such a manner that brake cooling air may be discharged therefrom in a direction generally radially outwardly from the rotational axis of the wheel in one form of the invention or in a direction generally coincident with the rotational axis of the wheel in another form of the invention.

It is still a further object of this invention to provide novel means for associating a wheel disc mounted fan and a wheel disc mounted wheel cover in such a manner that the cover provides a discharge louvres for the air circulated by the fan.

It is a further object of this invention to provide an air circulating device for a motor vehicle wheel or the like wherein the device is so arranged that it effectively cools the wheel brake drum by circulating air from the inner side of the wheel to the outer side of the wheel through channels or conduits formed in the wheel disc and in the wheel cover.

Other objects and advantages of this invention will become apparent from a reading of the following description and a consideration of the related drawings, wherein:

Fig. 1 is a partial side elevation of a vehicle wheel embodying this invention wherein certain elements are broken away and shown in section to more clearly disclose the structural relationship of the several component parts;

Fig. 2 is an enlarged fragmentary sectional elevation taken along the line 2—2 of Fig. 1;

Fig. 3 is a fragmentary sectional elevation taken on the line 3—3 of Fig. 2;

Fig. 4 is an enlarged fragmentary sectional elevational view of a modified form of cover plate having a different type of wheel connecting means associated therewith;

Fig. 5 is a sectional elevational view taken along the line 5—5 of Fig. 4;

Fig. 6 is a fragmentary side elevational view of a modified form of the invention with portions broken away and shown in section;

Fig. 7 is an enlarged fragmentary sectional elevational view taken along the line 7—7 of Fig. 6;

Fig. 8 is a fragmentary sectional elevational view taken along the line 8—8 of Fig. 7;

Fig. 9 is an enlarged fragmentary sectional elevational view of another modified form of the invention; and Fig. 10 is a sectional elevational view taken along the line 10—10 of Fig. 9.

It is thought to be unnecessary to specifically point out to a worker in this art why air cooling of the brake drums of a friction type brake improves brake capacity, eliminates brake fading, reduces brake lining wear, reduces the required brake diameter, reduces the required clearances between the brake parts, and provides a more reliable and more effective brake under all conditions of operation. While various attempts have been made to provide effective means for cooling the brake drums of friction type brakes, such attempts have usually involved costly, complicated designs that could not be readily incorporated in the conventional wheel assembly and often such designs provided such inadequate cooling that the expense involved was not justified. It is thought that the construction herein disclosed is one of the first to provide effective brake drum cooling means with a minimum amount of expense and a minimum amount of alteration of the conventional motor vehicle wheel assembly wherein the cooling device also provides a means for improving the appearance of the wheel assembly.

As a result of the general desire to improve the appearance of the current motor vehicle, it has become quite prevalent to provide motor vehicle wheels with decorative wheel covers. These covers tend to substantially close off the circulation of air through the wheels and across the associated wheel braking mechanisms. At the same time vehicle speeds have increased without an equivalent increase in the size of the associated brake drum, consequently, more heat is being generated in the brake drum during braking action while less efficient forms of heat dissipating devices have been provided for cooling the drums. This invention provides an improved brake cooling device comprising a highly decorative wheel cover having a fan element associated therewith to circulate cooling air across the associated wheel brake drums, the fan element and associated wheel cover being so constructed and arranged that a maximum cooling effect is achieved. Furthermore, the fan element is directly mountable on the wheel disc as a separate element from the wheel cover and thus the wheel cover is not required to support the weight of the fan element. This reduces the tendency of an impact force to dislodge the wheel cover from the wheel disc and permits a more compact fan and cover arrangement.

In the drawings the numeral 11 represents a wheel disc that is rotatably mounted on a support such as the shaft end 10 of a steering knuckle or wheel axle. The wheel disc 11 is formed from an annular rim element 12 connected by rivets, welds or the like 13 to an annular, perforated, disc-like wheel web portion 15. The perforated construction of the wheel web 15 provides a ring of axially extending openings or channels 17 through the wheel cover 41 and thus there is less tendency for the wheel cover to be thrown off the wheel 11 as a result of centrifugal force or impact loads.

Mounting the fan 61 in the manner shown nests the fan in the wheel web 15 and permits the fan blades 63 to be immediately adjacent the wheel web openings 17. This arrangement provides for a maximum air circulation from the inner to the outer side of the wheel and also permits the wheel cover 41 to be placed substantially flush with the outer side of the wheel. This flush arrangement tends to prevent the wheel cover 41 from being accidently knocked off the associated wheel 11 in the event the vehicle wheels are run too close to a curb during vehicle parking or the like.

With the arrangement shown in Figs. 1-3 it is even possible to omit the fan blades 63 from the plate 62 and to curve the brake drum fins 23b in such a manner that the fins 23b provide an efficient fan to force air from the inner side of the wheel to the outer side of the wheel. The curvature of the fins 23b in such a case might be similar to the blade curvature shown in Fig. 8.

In Figs. 4 and 5 are shown a modified form of wheel cover 141 comprising a dished cover plate 142 having the peripheral edge thereof connected to the edge 143a of a slotted or perforated louvre member 143. Louvre member 143 has a plurality of circumferentially extending slots or perforations 144 that provide discharge openings for the brake drum cooling air forced from the inner side of the associated wheel (not shown) to the outer side thereof. Louvre member 143 has a stiffening and cover positioning rib 143b and a flange 143c to which is connected, preferably at spaced points, the spring clips 145. Spring clips 145 may be connected to the louvre member flange 143c by rivets 146, as shown, or by welds or other similar connecting means. This construction permits the louvre member 143 to be formed from a relatively stiff material that need not be sufficiently resilient to provide the spring clip connector means 145 due to the fact that the clip 145 may be separate elements. A more rigid and less costly construction results from the Figs. 4 and 5 forms of the invention.

Figs. 6, 7 and 8 show another modified form of the invention. In this form of the invention the wheel cover 241 and the fan element 261 are arranged for a substantially axial flow of brake drum cooling air rather than for the substantially radial air flow that results from the Figs. 1-5 arrangements. The fan unit 261 comprises a dished plate 262 similar to the plate 62 of Figs. 1 and 2. Plate 262 is adapted to be connected to the wheel web 15 by spring clips (not shown) similar to clips 30 shown in Figs. 1 and 2. Plate 262 has mounted on one face thereof, adjacent its periphery, a plurality of fan blades 263. Blades 263 may be formed from a corrugated strip as shown clearly in Fig. 6 or the blades may be separate substantially Z-shaped elements. The blades 263 may be connected to the plate 262 by welds or the like 263c that fasten the inner blade flanges 263a to the plate 262. Surrounding the outer blade flanges 263d and connected thereto by welds or the like, is a shroud member 265. Shroud 265 ties the outer ends of the blades 263 together and also provides an air flow control member that directs the air passing through the wheel web openings 17 into the fan blades 263. The shroud 265 thus reduces turbulence and flow losses in the fan 261. To further improve the efficiency of the axial flow fan 261 the blades 263 may be formed as shown in Figs. 7 and 8 wherein the blades taper from the inner flange 263a to the outer flange 263d and the curvature of the blades varies accordingly (see Fig. 8).

Fan 261 nests within the wheel rim and web portions 12, 15 in the same manner as the fan 61 shown in Figs. 1 and 2. However, with the Figs. 6-8 form of the invention the wheel cover 241 may be mounted substantially flush against the wheel rim portion 12b due to the fact that the air flow is axial and discharge is through the openings 244 in the face of the cover plate 242. It is not necessary to leave air discharge openings between the cover plate periphery and the rim portion 12b in this form of the invention whereas such a space is necessary in the Figs. 1-5 forms of the invention. Accordingly, the form of the invention shown in Figs. 6-8 provides a more compact arrangement with less danger that the wheel covers will be knocked off in vehicle parking or the like. The wheel cover plate 242 has spring clip connector means 245 fastened to the inner side of its outer periphery so that on pressing the wheel cover 241 against the outer side of the wheel 11, the free ends 245a of the spring clips 245 will bite into the step portion 12b in the wheel rim 12, to detachably connect the cover 241 to the wheel 11.

In addition to the nested, compact design provided by the axial flow brake drum cooling fan construction shown in Figs. 6-8, it has been found that this construction provides a maximum air flow due to the smooth, substantially straight, flow path of the cooling air when passing from the inside of the wheel to the outside of the wheel.

In Figs. 9 and 10 are shown another modified form of the invention wherein the wheel cover element 341 and the fan element 362 are combined into a single unit of compact, economical design. In this form of the invention the wheel cover plate 342 is of imperforate design similar to the plates 42 and 142 of the Figs. 1-5 forms of the invention. The peripheral edge 342a of plate 342 is crimped about the edge 362a of the fan plate or rim 362. Fan plate 362 is arranged to project axially from the inner side of the wheel cover plate 342. An upstanding rib 362b is formed in the fan plate 362 to stiffen the plate 362 and to provide a cover plate positioning rib adapted to seat against the stepped formation 12b in the wheel rim 12. Intermediate the outer edge 362a and the positioning rib 362b of the fan plate 362, the plate 362 is provided with punched out fan blades 363. The blades 363, when bent perpendicular to the plate 362, provide openings 364 in the plate 362 which serve as discharge louvres for the brake drum cooling air forced through the wheel web openings 17 during rotation of the wheel 11. A cover plate attaching rim or clip means 365 projects axially inwardly from the rib 362b of the fan plate 362 so as to provide means for detachably connecting the combination fan and cover plate to the wheel 11. Clips 365 may be of either form shown in Figs. 1-5.

While this form of the invention has the fan element 361 mounted on the wheel cover 341, still, this simplified arrangement is such that the weight of the fan element 361 is kept to a minimum and thus there is little likelihood that any impact force to the rotating wheel cover will tend to dislodge the wheel cover 341 from the wheel 11.

Another advantage of the form of the invention shown in Figs. 9 and 10 is that the combination wheel cover and brake drum cooling unit is a unitary assembly that can be quickly and easily installed or removed by a simple snap-on or snap-off operation. The relative low cost of manufacture of this form of the invention is another point in its favor.

I claim:

1. For use with a rotatable wheel including a slotted web portion and a connected, encircling, rim portion, with a wheel carried brake drum mounted on one side of said wheel web portion, a suction fan mounted on the other side of said wheel web portion adapted to draw brake drum cooling air from said one side of said wheel web portion across said drum and through the slotted wheel web portion for discharge adjacent the rim at the other side of said wheel web portion, said fan comprising a wheel cover mounted on the other side of said wheel completely enclosing said other side of the wheel web portion and spaced axially outwardly from said other side of the wheel web portion, said cover having an imperforate race portion and a perforated, axially extending, peripheral flange detachably connected to the wheel rim portion, said perforated, peripheral flange having portions sheared therefrom providing inwardly directed, radially extending fan blades to circulate the brake drum cooling air.

2. For use with a wheel comprising a perforated web portion having wheel braking means secured to one side of said wheel web portion, a wheel cover to be secured to said wheel and extending completely over the other side of said wheel web portion, said cover comprising an imperforate cover plate having a perforated, axially extending, peripheral rim attached hereto, said plate rim having radially extending fan vanes secured to the innerside thereof and positioned adjacent the perforations in said rim whereby said vanes circulate air from the area adjacent said braking means on said one side of said wheel web portion through the perforated wheel web portion to the area on said other side of said web portion on rotation of said wheel.

3. A combination wheel cover and air circulating fan comprising an imperforate, disc-like, cover plate having an annular, axially extending peripheral rim element extending substantially normal to the cover plate at one side thereof, said rim element including a plurality of circumferentially extending slots, a plurality of inwardly directed, radially extending fan blades projecting from said rim adjacent rim slots, an upstanding plate positioning rib extending circumferentially of said rim, and a resilient flange portion projecting from said rim adapted to be detachably connected to a cover supporting wheel assembly.

4. A wheel cover comprising an imperforate, disc-like, cover plate having an annular, axially extending peripheral rim element extending substantially normal to the cover plate at one side thereof, said rim element including a plurality of circumferentially extending slots, radially extending fan vanes on said rim adjacent said slots, an upstanding plate positioning rib extending circumferentially of said rim, and a flange portion projecting from said rim having resilient clip means adapted to be detachably connected to a cover supporting wheel assembly.

5. For use with a wheel member having a perforated web portion on one side of which is arranged a heat generating mechanism, a wheel cover adapted to be secured to said wheel and to completely cover the other side of said wheel web portion, said cover comprising an imperforate, radially extending, cover plate to which is attached a perforated, axially extending, peripheral rim portion, said rim portion having integral, radially extending, fan vanes formed therefrom and arranged adjacent the perforations in said rim portion whereby on wheel rotation said vanes withdraw air from the area adjacent the heat generating mechanism on said one side of said wheel web portion through the perforated wheel web portion and discharge the withdrawn air through the perforations in the axially extending rim portion of said wheel cover.

6. For use with a wheel member having a perforated web portion, a wheel cover adapted to be secured to said wheel and to completely cover one side of said wheel web portion, said cover comprising an imperforate, radially extending, cover plate to which is attached a perforated, axially extending, peripheral rim portion, said rim portion having integral, air circulating, radially extending vanes formed therefrom and arranged adjacent the perforations in said rim portion whereby said air circulating means, on wheel rotation, withdraws air from the area adjacent the other side of said wheel web portion through the perforated wheel web portion and discharges the withdrawn air through the perforations in the axially extending rim portion of said wheel cover.

7. For use with a wheel member having a perforated web portion, a wheel cover adapted to be secured to said wheel and to completely cover one side of said wheel web portion, said cover comprising an imperforate, radially extending, cover plate to which is attached a perforated, axially extending, peripheral rim portion, said rim portion having integral, air circulating, radially extending vanes formed therefrom and arranged adjacent the perforations in said rim portion whereby said air circulating means, on wheel rotation, will circulate air between opposite sides of said wheel web portion by way of the perforated wheel web portion.

References Cited in the file of this patent

UNITED STATES PATENTS

| | | |
|---|---|---|
| 911,540 | Guilford | Feb. 2, 1909 |
| 1,177,824 | Silberzahn | Apr. 4, 1916 |
| 2,109,722 | Fawick | Mar. 1, 1938 |
| 2,143,950 | Kliesrath | Jan. 17, 1939 |
| 2,175,044 | Halteran | Oct. 3, 1939 |
| 2,274,496 | Mulhern | Feb. 24, 1942 |
| 2,331,259 | Whitten | Oct. 5, 1943 |
| 2,351,655 | Aske | June 20, 1944 |
| 2,368,238 | Lyon | Jan. 30, 1945 |
| 2,433,854 | Lyon | Jan. 6, 1948 |
| 2,441,008 | Chase | May 4, 1948 |
| 2,561,160 | Weasler | July 17, 1951 |
| 2,600,410 | Lyon | June 17, 1952 |
| 2,633,944 | Butterfield | Apr. 7, 1953 |
| 2,646,862 | Dodge | July 28, 1953 |

FOREIGN PATENTS

| | | |
|---|---|---|
| 431,007 | Italy | Feb. 23, 1948 |

Sept. 4, 1956 H. M. ANDERSON 2,761,531
SECTIONAL MAST
Filed Feb. 19, 1951 2 Sheets-Sheet 1
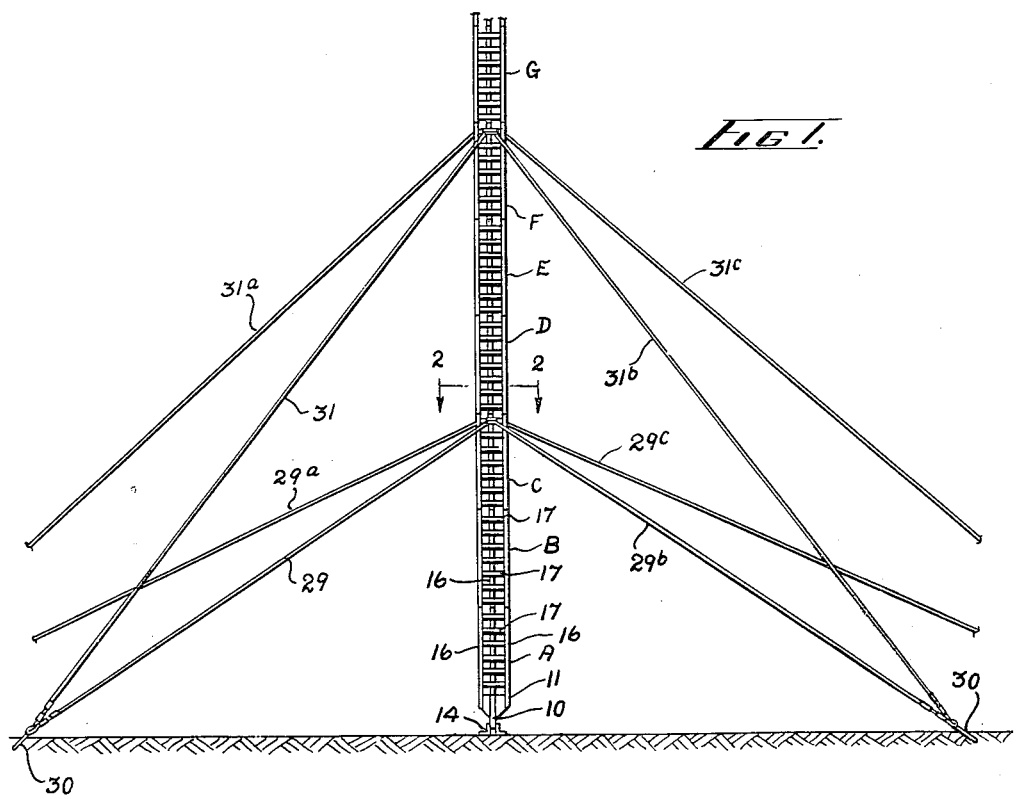
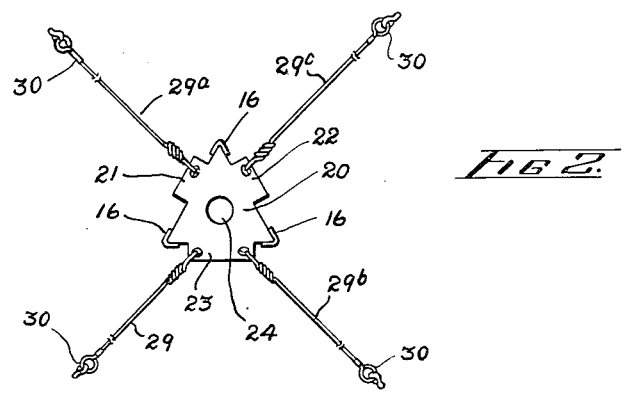
INVENTOR
Harry M Anderson
by Geo. R. Riches
ATTORNEY